(12) United States Patent
Sangiovanni et al.

(10) Patent No.: US 10,836,129 B2
(45) Date of Patent: Nov. 17, 2020

(54) PROCESS AND APPARATUS FOR BUILDING TYRES

(75) Inventors: Stefano Sangiovanni, Milan (IT); Ivan Gildo Boscaino, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 192 days.

(21) Appl. No.: 12/988,987

(22) PCT Filed: Apr. 23, 2008

(86) PCT No.: PCT/IT2008/000290
§ 371 (c)(1),
(2), (4) Date: Oct. 21, 2010

(87) PCT Pub. No.: WO2009/130727
PCT Pub. Date: Oct. 29, 2009

(65) Prior Publication Data
US 2011/0036484 A1    Feb. 17, 2011

(51) Int. Cl.
*B29D 30/16*    (2006.01)
*B29D 30/30*    (2006.01)
(Continued)

(52) U.S. Cl.
CPC ......... *B29D 30/16* (2013.01); *B29D 30/1628* (2013.01); *B29D 30/30* (2013.01);
(Continued)

(58) Field of Classification Search
CPC ............ B29D 30/1621; B29D 30/1628; B29D 30/3021; B29D 30/3028; B29D 30/16;
(Continued)

(56) References Cited

U.S. PATENT DOCUMENTS 3,418,191 A * 12/1968 Dieckmann et al. ......... 156/397
3,455,764 A *  7/1969 Bryant ............... B29D 30/3007
156/361

(Continued)

FOREIGN PATENT DOCUMENTS

EP     0 968 814 A2    1/2000
EP     1 033 236 A2    9/2000
(Continued)

OTHER PUBLICATIONS

International Search Report from the European Patent Office for International Application No. PCT/IT2008/000290 (dated Jan. 28, 2009).

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A continuous elongated element of elastomeric material is produced through an extruder at a linear delivery speed and directly fed onto a moving surface of a conveyor without interposition of other devices. The continuous elongated element is advanced on the moving surface along a predetermined direction and at a linear advancing speed different from the linear delivery speed until a proximal end of the conveyor. Subsequently, the continuous elongated element is applied onto a forming support which rotates relative to the proximal end of the conveyor at a peripheral speed different from the linear delivery speed, so as to deform the continuous elongated element and apply it in the form of wound coils onto the forming support in order to form a component of elastomeric material of a tyre.

16 Claims, 4 Drawing Sheets

(51) Int. Cl.
*B29D 30/60* (2006.01)
*B29D 30/44* (2006.01)

(52) U.S. Cl.
CPC ......... *B29D 30/3028* (2013.01); *B29D 30/60* (2013.01); *B29D 2030/4437* (2013.01); *B29D 2030/4456* (2013.01)

(58) Field of Classification Search
CPC ............ B29D 30/30; B29D 30/60; B29D 2030/1678; B29D 2030/3078; B29D 2030/4443; B29D 2030/4456
USPC ............... 156/117, 397, 130, 406.4
See application file for complete search history.

(56) References Cited

U.S. PATENT DOCUMENTS

| | | | |
|---|---|---|---|
| 3,871,810 A * | 3/1975 | Geyer | B29C 47/32 425/374 |
| 4,240,863 A | 12/1980 | Vinton | |
| 5,942,059 A * | 8/1999 | Wulker et al. | 156/64 |
| 6,372,070 B1 | 4/2002 | Iizuka et al. | |
| 6,554,041 B1 | 4/2003 | Ohki et al. | |
| 6,989,067 B2 * | 1/2006 | Armstrong et al. | 156/187 |
| 7,152,648 B2 * | 12/2006 | Usami et al. | 156/353 |
| 2004/0200562 A1 | 10/2004 | Armstrong, Jr. et al. | |

FOREIGN PATENT DOCUMENTS

| | | | |
|---|---|---|---|
| EP | 1818165 A1 * | 8/2007 | |
| JP | 06-000890 | 1/1994 | |
| JP | H11-291363 A | 10/1999 | |
| JP | 2003-513835 A | 4/2003 | |
| JP | 2005-153145 | 6/2005 | |
| JP | 2005-186586 A * | 7/2005 | |
| JP | 2007-237508 | 9/2007 | |
| WO | WO-99/61230 A1 * | 12/1999 | |
| WO | WO-01/36185 | 5/2001 | |
| WO | WO 01/36185 A1 | 5/2001 | |
| WO | WO-2007/000443 A1 | 1/2007 | |
| WO | WO-2007/088455 A2 * | 8/2007 | |
| WO | WO-2008/053278 A1 * | 5/2008 | |

OTHER PUBLICATIONS

Decision on Rejection from corresponding Japanese Patent Application No. 2011-505644, dated Jan. 28, 2013.
Notice of Reasons for Rejection from corresponding Japanese Patent Application No. 2011-505644, dated Jun. 27, 2012.
Notice of Reasons for Rejection from corresponding Japanese Patent Application No. 2011-505644, dated Sep. 24, 2013.
Japanese Office Action for Patent Application No. 2014-060667 dated Mar. 16, 2015.

* cited by examiner

PROCESS AND APPARATUS FOR BUILDING TYRES

CROSS REFERENCE TO RELATED APPLICATION

This application is a national phase application based on PCT/IT2008/000290, filed Apr. 23, 2008.

BACKGROUND OF THE INVENTION

Field of the Invention

The present invention relates to a process for building tyres and to an apparatus for building tyres operating in accordance with said process.

Description of the Related Art

A tyre generally comprises a carcass structure including at least one carcass ply having end flaps in engagement with respective annular anchoring structures, each usually formed of at least one substantially circumferential annular insert onto which at least one filling insert radially tapering away from the rotation axis is applied.

Associated with the carcass structure at a radially external position is a belt structure comprising one or more belt layers, arranged in radially superposed relationship relative to each other and to the carcass ply, provided with textile or metallic reinforcing cords having a crossed orientation and/or disposed substantially parallel to the circumferential extension direction of the tyre. At a radially external position to the belt structure, a tread band is applied which is also of elastomeric material like other semifinished products constituting the tyre.

A so-called "underlayer" of elastomeric material can be interposed between the tread band and the belt structure, which underlayer has properties adapted to ensure a steady union between belt structure and tread band.

Respective sidewalls of elastomeric material are further applied to the side surfaces of the carcass structure, each extending from one of the side edges of the tread band until close to the respective annular anchoring structure to the beads.

It is to be pointed out that, to the aims of the present description, by the term "elastomeric material" it is intended a compound comprising at least one elastomeric polymer and at least one reinforcing filler. Preferably this compound further comprises additives such as a cross-linking agent and/or a plasticizer. Due to the presence of the cross-linking agent, this material can be cross-linked through heating, so as to form the final product.

In tyres of the "tubeless type", the carcass ply is fully coated with a layer of preferably butyl-based elastomeric material, usually referred to as "liner", which has optimal airtightness features and extends from one of the beads to the other.

In tyres of the run-flat type or for other particular uses, the carcass structure can be further provided with auxiliary support inserts of elastomeric material, located at an axially internal position relative to each of the sidewalls. These auxiliary support inserts, usually called "sidewall inserts", lend themselves to support loads transmitted to the wheel in case of accidental deflation of the tyre, to enable the vehicle to go on running under safety conditions.

In many known processes for manufacture of a tyre the carcass structure and belt structure as well as the tread band, sidewalls and any other elastomeric structural element are made separately of each other in respective work stations, and then stored in storage stations or warehouses from which they are subsequently picked up for mutual assembly along a tyre building line.

It is to be pointed out that by "component of elastomeric material" of the tyre in this context it is intended any part of elastomeric material in the tyre (e.g. the tread band, sidewalls, liner, under-liner, fillers in the bead region, sidewall inserts in run-flat tyres, abrasion-proof inserts, and so on), or portion thereof, or still the assembly formed of two or more of said parts or portions thereof.

More recently, production processes have been developed as the one described in document WO 01/36185 in the name of the same Applicant, in which the following steps are carried out for making tyre components of elastomeric material for vehicle wheels: feeding a continuous elongated element from a delivery member disposed adjacent to a toroidal support for applying said elongated element onto the toroidal support; giving the toroidal support a circumferential-distribution rotary motion around a geometric rotation axis thereof, so that the elongated element is circumferentially distributed on the toroidal support; carrying out controlled relative displacements for transverse distribution between toroidal support and delivery member in order to form a component of a tyre with said elongated element, which component is defined by a plurality of coils laid in approached and mutually superposed relationship according to a predetermined laying scheme depending on a predetermined cross-section profile to be given to said component; wherein the circumferential-distribution rotary movement is controlled as a function of the distance existing between an application point of the elongated element onto the toroidal support and said geometric rotation axis, to give the toroidal support, at the application point, a peripheral application speed having a nominal value greater than and proportional to a theoretical feeding speed of the elongated element by said delivery member.

EP 1 033 236 discloses an apparatus for making rubber components, such as components for tyres, comprising a unit provided with an extruder and a pair of compression rollers to produce an unvulcanised rubber tape, a winding drum around which the rubber tape is wound up to form one of said components, a conveyor for transport of the unvulcanised rubber tape towards the winding drum. The compression rollers form a slit adapted to compress and shape the extruded rubber into a rubber tape provided with a specific cross section. The conveyor comprises a conveyor belt wrapped around rollers and having a side on which the rubber tape is positioned. The conveyor consists of a section for receiving the rubber tape, a storage section and a device capable of moving the conveyor belt along an axial direction of the winding drum.

This device is provided with an end roller around which the conveyor belt is wrapped and from which the rubber tape is released towards the winding drum.

SUMMARY OF THE INVENTION

In this technical field, the Applicant has felt the necessity:
to increase speed and improve efficiency of the production processes adapted to lay a continuous elongated element on a forming support;
to increase reliability, speed and versatility of these apparatuses;

to simplify structure of the apparatuses designed to carry out these production processes while reducing bulkiness;

to improve quality of the produced continuous elongated element and quality of the manufactured tyres at least partly through laying of said element;

to overcome process problems connected with use of rollers exerting pressure on the continuous elongated element, in particular those resulting from undesirable adhesion between the forming surfaces and the continuous elongated element.

The Applicant has verified that apparatuses of the type disclosed in EP 1 033 236 carrying out calendering of the tape immediately downstream of the extruder delivery opening to give said tape a correct section and subsequently feeding the tape through a complex series of mechanisms adapted to store it and stabilise it in size, are mechanically very complicated and, consequently, of reduced reliability, very expensive, of difficult setting and requiring frequent servicing interventions.

The Applicant has further found that the storage section described in said document makes the apparatus very bulky and this bulkiness on the whole adversely affects the plant's sizes. In fact, even when the rubber tape is not wound up around the drum, the conveyor belt goes on moving at a constant speed so as to build up the rubber tape until laying of same on the drum is started again. Therefore, the sizes of the storage section must be sufficient to enable this building-up operation.

In addition, the Applicant has noticed that each time the cross section of the rubber tape is required to be changed, the apparatus must be compulsorily stopped to replace the calender's rollers, which operation does not make the process very flexible.

The Applicant has then observed that apparatuses of the type described in document EP 1 033 236 could not operate should the material constituting the rubber tape be of such a nature that it does not adhere to the conveyor belt, because this rubber tape, once cutting has been completed, cannot be retained on the conveyor in any manner.

The Applicant has further perceived that where tyres are built on toroidal forming supports as described in WO 01/36185, it may be advantageous that deformation of the continuous elongated element be distributed in at least two distinct stages to obtain; on laying, the desired section of the continuous elongated element. In fact, in building processes carried out on toroidal supports, the component being formed must already have a shape very close to that of the finished product at the end of the vulcanisation and moulding step, because no shaping step is carried out. For the above reason, the continuous elongated element must take a shape sometimes very different from that imparted at the extruder's delivery opening, which situation can cause stresses and particular tensions thereon: consequently, division of the deformation to which it is submitted into several steps reduces stresses and tension, bringing about a reduction in the risks of obtaining a product to be discarded.

The Applicant has therefore found that it is possible to overcome the above described problems by eliminating calendering of the continuous elongated element of elastomeric material exiting the extruder, and carrying out a first longitudinal deformation of the continuous elongated element immediately downstream of said extruder and subsequently deforming the continuous elongated element until giving it the desired cross-section.

More particularly, in a first aspect, the present invention relates to a process for building tyres comprising the step of forming components of elastomeric material on a forming support, wherein at least one of said components of elastomeric material is made through the steps of:

producing a continuous elongated element of elastomeric material by an extruder, which element has a linear delivery speed on coming out of said extruder;

feeding the continuous elongated element directly on a moving surface of a conveyor without interposition of other devices;

advancing said continuous elongated element of elastomeric material on the moving surface along a predetermined direction and at a linear advancing speed different from said linear delivery speed, until close to a proximal end of said conveyor adjacent to the forming support;

applying the continuous elongated element into coils wound up on the forming support, to form said at least one component of elastomeric material of the tyre; said forming support rotating relative to the proximal end of the conveyor at a peripheral speed;

wherein the peripheral speed is different from the linear delivery speed, so as to deform the continuous elongated element.

In accordance with a second aspect, the present invention relates to an apparatus for building tyres, comprising:

at least one forming support;

at least one forming device to form components of elastomeric material on the forming support;

wherein said at least one forming device comprises:

at least one extruder to deliver a continuous elongated element of elastomeric material at a linear delivery speed;

at least one conveyor for said continuous elongated element having a moving surface along a predetermined direction at a linear advancing speed different from said linear delivery speed and towards a proximal end of the conveyor adjacent to the forming support;

at least one device for application of said continuous elongated element onto said forming support, positioned close to the proximal end of the conveyor;

devices for rotating said forming support on an axis thereof relative to the proximal end of the conveyor at a peripheral speed;

wherein the extruder feeds the continuous elongated element directly onto the conveyor without interposition of other devices;

wherein the peripheral speed is different from the linear delivery speed, so as to deform the continuous elongated element.

By adopting the process and apparatus in accordance with the invention, the Applicant has obtained a great structural simplification of the apparatus relative to those of the known art, a reduction in bulkiness, a reduction in the manufacturing and servicing costs of the apparatus, and increase in reliability and in the tyre production speed and flexibility.

In fact, it is possible to obtain the correct section of the continuous elongated element through deformation in two steps and without use of a calender. In addition, an extruder having a delivery opening of a section even greatly bigger than the section of the applied continuous elongated element can be used, since the desired section is obtained by drawing. Therefore, when the section of the applied continuous elongated element is to be changed, it is not necessary to change each time the calender and/or the flange of the extruder in which said delivery opening is formed and this ensures more flexibility to the apparatus. In addition, storage of the continuous elongated element is no longer required as it can be produced exactly at the moment of use, thus avoiding building-up of same, which would involve possible decay and waste of material.

The present invention, in at least one of the above mentioned aspects, can have one or more of the preferred features hereinafter described.

Preferably, the peripheral speed is higher than the linear delivery speed so as to draw the continuous elongated element.

Preferably, the peripheral speed is higher than or as high as about 1.2 times the linear delivery speed.

In addition, preferably, the peripheral speed is higher than or as high as about 1.3 times the linear delivery speed.

Preferably the peripheral speed is lower than or as high as about 1.6 times the linear delivery speed. Preferably, the peripheral speed is lower than or as high as about 7 times the linear delivery speed.

The amount of the speed increase relative to the extrusion speed depends on the features of the material of the continuous elongated element and on the section of the continuous elongated element that is wished to be obtained during laying.

According to a preferred embodiment, the peripheral speed is lower than the linear delivery speed, so as to compress the continuous elongated element.

Preferably, the peripheral speed is included between about 0.5 times and about 0.95 times the linear delivery speed.

More preferably, the peripheral speed is included between about 0.65 times and about 0.85 times the linear delivery speed.

According to a preferred embodiment of the process, the linear advancing speed is higher than the linear delivery speed.

In fact, it is advantageous that the longitudinal deformation of the continuous elongated element be carried out in two steps.

Preferably, the linear advancing speed is lower than or as high as about 1.5 times the linear delivery speed.

Drawing of the continuous elongated element in this manner is carried out in two subsequent steps, a first step immediately after exit from the extruder and a second step during application onto the forming support. Drawing in two steps allows damaging of the continuous elongated element to be eliminated or at least reduced. In fact, the continuous elongated element delivered from the extruder has high and uneven temperatures and pressures. If submitted to a single drawing operation in the conditions as delivered from the extruder in particular in case of critical, i.e. not very elastic, blends, the continuous elongated element becomes damaged because crackings and/or burrs are generated on its surface.

Laying and advancing on the moving surface of the conveyor carried out before the final application step allows the continuous elongated element to cool and take uniform pressure and temperature conditions, so that the subsequent second drawing step, obtained by means of an increase in the peripheral speed of the drum relative to the linear advancing speed of the conveyor, can be carried out without the quality of the continuous elongated element being impaired.

More preferably, the linear advancing speed is higher than or as high as about 1.005 times the linear delivery speed.

Alternatively, according to a preferred embodiment of the process, the linear advancing speed is lower than the linear delivery speed.

Preferably the linear advancing speed is higher than or as high as about 0.75 times the linear delivery speed.

More preferably, the linear advancing speed is lower than or as high as about 0.995 times the linear delivery speed.

In the first step, a compression operation is carried out in place of drawing, which compression is adapted to compensate for the cooling effects of the continuous elongated element coming out of the extruder. In fact, the continuous elongated element tends to contract during cooling. The cooling effect generates axial stresses in the continuous elongated element. Compression carried out when the blend of the continuous elongated element is still hot prevents formation of said stresses and avoids generation of crackings and/or burrs due to contraction, as said continuous elongated element gets cool.

According to a preferred embodiment of the process, the ratio of the linear advancing speed to the linear delivery speed is maintained constant during the step of applying said continuous elongated element.

Alternatively, the ratio of the linear advancing speed to the linear delivery speed is varied during the step of applying said continuous elongated element.

In addition, preferably, the ratio of the peripheral speed to the linear delivery speed is maintained constant during the step of applying said continuous elongated element.

Alternatively, the ratio between the peripheral speed and linear delivery speed is varied during the step of applying said continuous elongated element.

Variation in speeds during laying allows either possible variations in the features of the elongated elements to be actively compensated for, which variations are for example due to unexpected pressure and/or temperature variations, or the section of the elongated element and/or the laying speed to be varied based on previously established programs and/or on the shape of the laying surface of the forming support.

Preferably, the linear advancing speed is given to the continuous elongated element by pressing said continuous elongated element on the moving surface through at least one presser device.

This solution is simple from a structural point of view and in addition in case of blends containing fibres, such as the "kevlar pulp", possibly allows a predetermined orientation to be given to these fibres while the blend is still hot.

Advantageously, at the end of application, the continuous elongated element is cut between the extruder and the conveyor.

While the continuous elongated element is being cut, the extruder is stopped. The length of the continuous elongated element remaining downstream of the cutting point passes onto the conveyor and is applied to the forming support. Therefore, management of long lengths of continuous elongated element remaining between the extruder and the forming support is not required between an application and the subsequent one. In addition, before a new application, routing of the continuous elongated element between the roller of the presser device and the conveyor belt is easy, because it is not required that said continuous elongated element be passed through the shaped slit of the calender, in which case the continuous elongated element would be also likely to remain attached to the calender's steel roller.

According to a preferred embodiment, the apparatus comprises a control unit operatively connected to the extruder, the conveyor and the devices for rotating said forming support on an axis thereof and adapted to control and adjust the linear delivery speed, linear advancing speed and peripheral speed.

Adopting the electronic control unit allows all speeds to be inputted in a simple manner before each application and/or these speeds to be controlled and adjusted during said application.

Preferably, the apparatus further comprises a presser device facing the moving surface of the conveyor and having a side surface to be engaged with the continuous elongated element.

The presser device keeps a contact between the continuous elongated element and the moving surface and ensures that the conveyor's speed be imparted to the continuous elongated element.

In a preferred embodiment, the presser device comprises a roller carrying the side surface and a presser element operatively acting on the roller, to press said side surface against the continuous elongated element.

In addition, preferably, the presser element is of the elastic type. This structure is simple, efficient, reliable and inexpensive.

Preferably, the presser device is positioned at a distal end of the conveyor adjacent to the extruder. In this way, the continuous elongated element is immediately brought into contact with the moving surface which is utilised over the whole extension thereof.

According to a preferred embodiment, the conveyor comprises a conveyor belt wrapped on rollers and having a going stretch defining the moving surface.

Preferably the conveyor belt is wrapped on a proximal roller located at the proximal end of the conveyor.

In addition, the conveyor belt is wrapped on a distal roller located at a distal end of the conveyor adjacent to the extruder.

More preferably, the going stretch is rectilinear and the moving surface lies in a single plane.

This structure is simple, efficient, reliable and inexpensive.

Preferably, said at least one application device comprises at least one application member operatively supported relative to the conveyor and acting in thrust relationship towards the forming support.

In addition, preferably, the extruder comprises a cylinder having a delivery opening and a rotating screw housed in the cylinder and having an end close to said delivery opening.

Preferably, the extruder comprises a gear pump interposed between the rotating screw and the delivery opening.

Between the end of the rotating screw and the delivery opening or between the gear pump and said delivery opening there is no duct adapted to direct the blend away from the extruder. Therefore damages to the blend and the continuous elongated element thus produced due to the high temperatures and pressures inside the duct are avoided, which temperatures and pressures are required for keeping the blend to the fluid state. Therefore, generation of local scorches on the elastomeric material may occur within the duct, due to friction and induced heating, which local scorches lead to localised vulcanisation and impair the quality of the continuous elongated element. The vulcanised blend can in addition adhere to the duct walls, causing a reduction in the passage section of the duct itself, thus increasing pressure and temperature inside the latter, triggering a cycle making worse the features of the blend forming the continuous elongated element.

In accordance with a preferred embodiment, said forming support is a toroidal support.

Preferably, the radially external surface of said toroidal support is shaped according to the radially internal surface of the tyre to be built. After application of the continuous elongated element, the formed component therefore already has the substantially final shape of the tyre.

In accordance with an alternative embodiment of the apparatus, said forming support is a cylindrical drum. After application of the continuous elongated element, the formed component must be therefore submitted to a shaping operation adapted to give the carcass ply or plies a toroidal configuration.

BRIEF DESCRIPTION OF THE DRAWINGS

Further features and advantages will become more apparent from the description of a preferred but not exclusive embodiment of a process and an apparatus for building tyres, in accordance with the present invention. This description will be set out hereinafter with reference to the accompanying drawings, given by way of non-limiting example, in which.

DETAILED DESCRIPTION OF THE INVENTION

With reference to the drawings, a plant for producing tyres comprising a building apparatus 2 in accordance with the present invention has been generally denoted at 1.

Plant 1 is intended for manufacturing tyres 3 (FIG. 4) essentially comprising at least one carcass ply 4 preferably internally coated with a layer of airtight elastomeric material referred to as "liner" 5, two so-called "beads" 6 integrating respective annular anchoring structures 7 possibly associated with elastomeric fillers 7a and in engagement with the circumferential edges of the carcass ply 4, a belt structure 8 applied at a radially external position to the carcass ply 4, a tread band 9 applied at a radially external position to the belt structure 8, in a so-called crown region of tyre 3, and two sidewalls 10 applied at laterally opposite positions to the carcass ply 4, each at a side region of tyre 3, extending from the corresponding bead 6 to the corresponding side edge of the tread band 9.

In run flat tyres or tyres intended for particular uses, auxiliary support inserts (not shown) can be also provided, of the type usually referred to as "sidewall inserts" for example, which are applied close to the sidewalls at an axially internal position to the carcass ply 4 or between two paired carcass plies 4, and/or at an axially external position to said at least one carcass ply 4.

Figure 4:
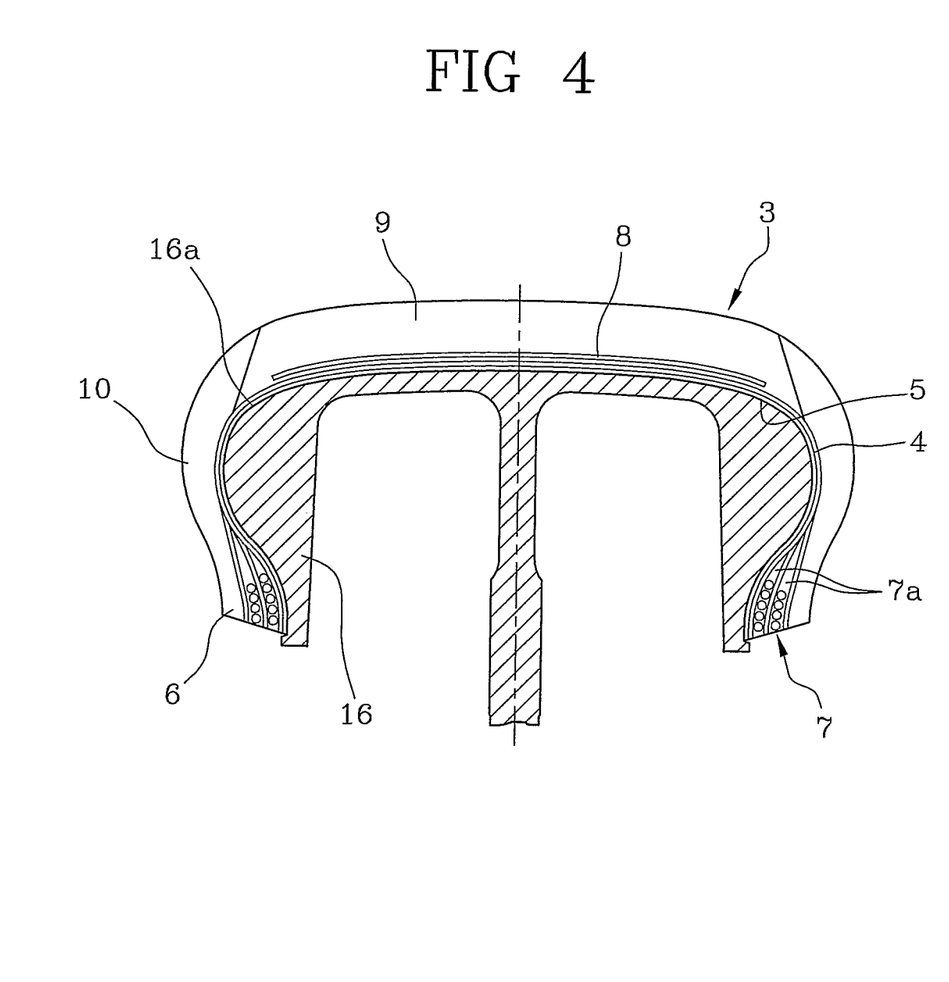
FIG. 4 shows a diametric section of an example of a tyre obtainable in accordance with the present invention.

The building apparatus 2 can comprise a plurality of building stations 11, 12, 13, 14, 15 (FIG. 1), each for example designed to form a component of tyre 3 under processing directly on a forming support 16 preferably of toroidal conformation, and more preferably having a radially external forming surface 16a shaped according to the radially internal surface of tyre 3 when building has been completed (FIG. 4).

Alternatively one or more components of tyre 3 under processing, instead of being directly made on the forming support 16 of toroidal conformation are provided to be obtained as semifinished products from preceding working steps and assembled to other components on said forming support 16. The latter can also have a cylindrical conformation or other shape different from the previously described ones.

Figure 1:
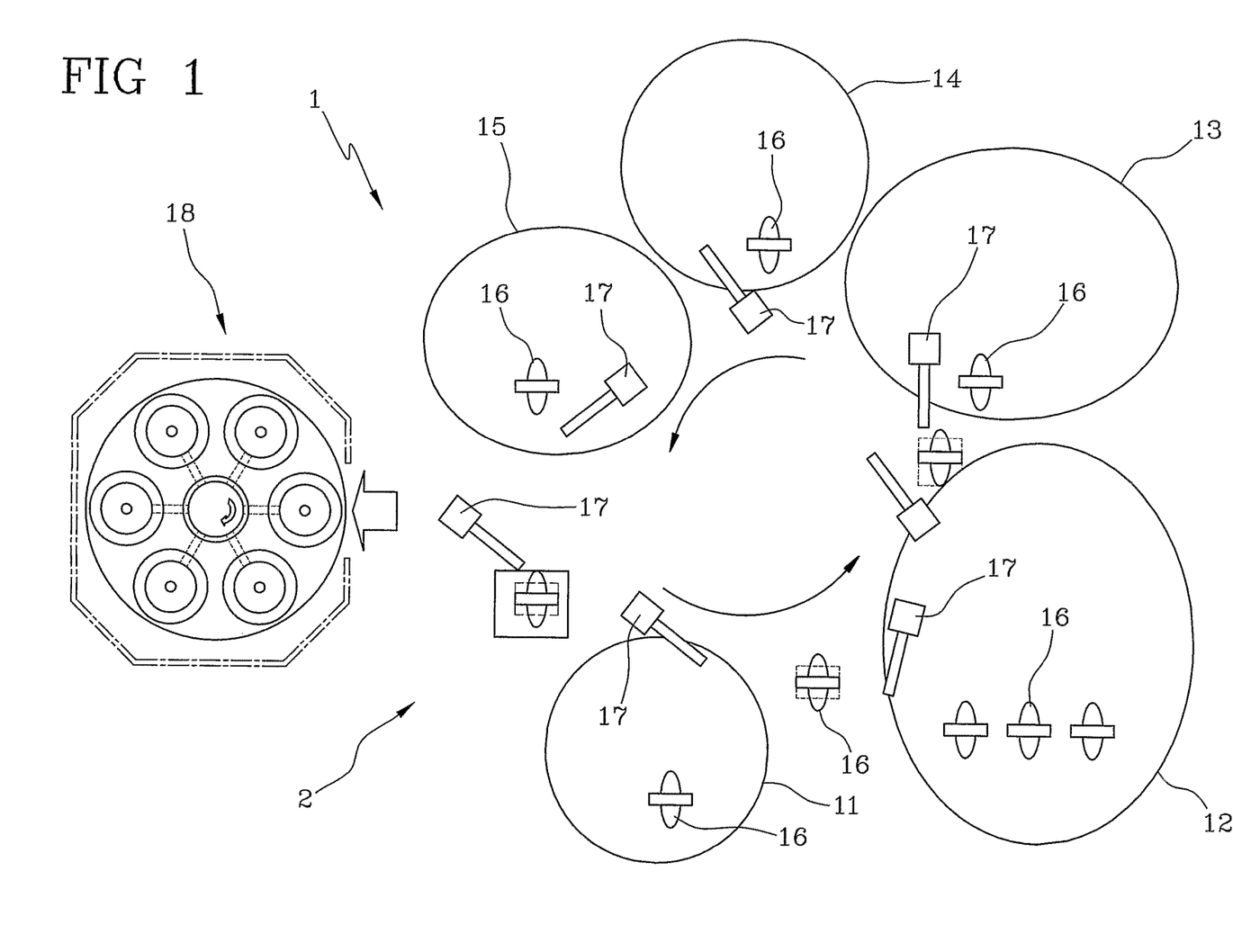
FIG. 1 is a diagrammatic top view of a plant for producing tyres comprising a building apparatus in accordance with the present invention.

By way of example, shown in FIG. 1 is a first station in which at least one component of elastomeric material, liner 5 for example, is made through winding of a continuous elongated element of elastomeric material into coils disposed mutually close and distributed along the forming surface 16a of the forming support 16 of toroidal conformation. In at least one second building station 12 manufacture of one or more carcass plies 4 can be achieved, which are obtained by laying strip-like elements on the forming support 16, in circumferentially approached relationship, which strip-like elements are formed from a continuous strip of elastomeric material cut to size comprising textile or metallic cords disposed in parallel side-by-side relationship. A third building station 13 can be dedicated to manufacture of the annular anchoring structures 7 and fillers 7a integrated into the tyre beads 6, respectively obtained through laying into radially superposed coils of at least one continuous elongated element comprising at least one rubber-coated metallic cord and through winding of a continuous elongated element of elastomeric material into coils disposed close to each other and distributed along said forming surface 16a. At least one fourth building station 14 can be dedicated to manufacture of the annular anchoring structure 8, obtained for example by laying of strip-like elements in circumferentially approached relationship, which are formed from a continuous strip of elastomeric material comprising preferably metallic cords mutually parallel, and/or through winding into axially approached coils of at least one rubber-coated reinforcing cord, preferably of metal, in the crown portion of tyre 3.

At least one fifth building station 15 can be designed for manufacture of the tread band 9 and sidewalls 10. Tread band 9 and sidewalls 10 are preferably obtained through winding of at least one continuous elongated element of elastomeric material, into mutually approached coils.

The building stations 11, 12, 13, 14, 15 can simultaneously operate each on a respective tyre 3 being processed, carried by a respective forming support 16, sequentially transferred from a building station to the subsequent building station, through robotized arms 17 or other suitable devices.

Tyres 3 built by apparatus 2 are sequentially transferred to at least one vulcanisation unit 18 integrated into plant 1.

Figure 2:
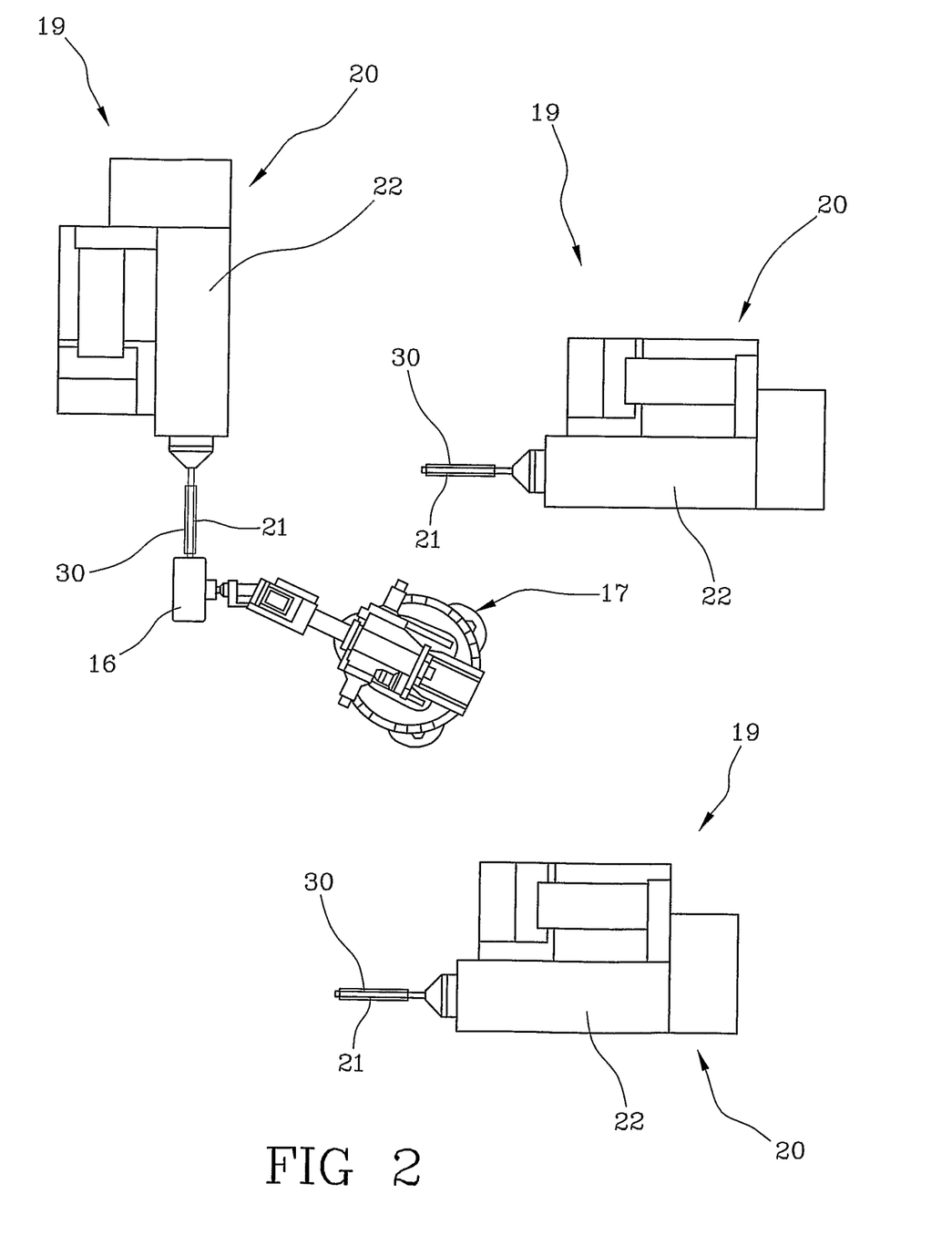
FIG. 2 is a diagrammatic top view of a detail of the plant seen in FIG. 1.
Figure 3:
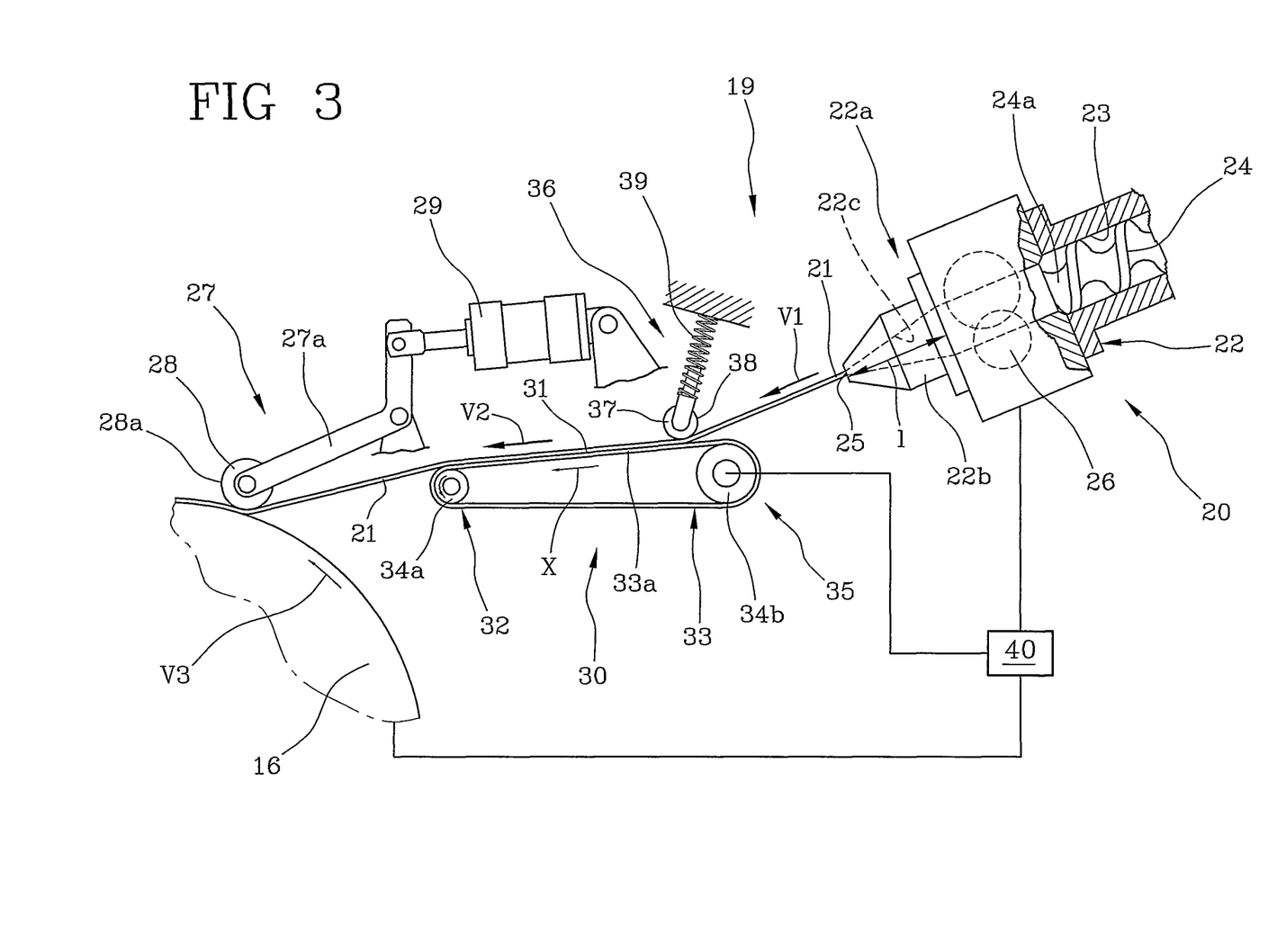
FIG. 3 is a diagrammatic side view of a forming device being part of the apparatus in reference.

In accordance with the present invention, at least one of the components in elastomeric material of tyre 3, such as liner 5, fillers 7a and/or other parts of elastomeric material of beads 6, sidewalls 10, tread band 9, under-belt layer, under-layer of the tread band, abrasion-proof elements and/or others, is obtained by a forming device generally denoted at 19 (FIGS. 2 and 3).

The forming device 19 comprises at least one feeding unit 20 supplying a continuous elongated element 21 of elastomeric material (FIGS. 2 and 3).

The feeding unit 20 comprises an extruder 22 provided with a cylinder 23 into which elastomeric material is introduced. Cylinder 23 heated to a controlled temperature, just as an indication included between about 40° C. and about 120° C., operatively houses a rotating screw 24, by effect of which the elastomeric material is pushed along cylinder 23, towards a delivery opening 25 of extruder 22. If required, the elastomeric material can be conveyed through a gear pump 26 for example, operatively interposed between the rotating screw 24 and the delivery opening 25, to ensure more flow rate uniformity through the latter.

In more detail, a flange 22a is mounted on extruder 22 and carries a die 22b defining said delivery opening 25. Preferably, the delivery opening 25 is disposed close to the gear pump 26 or, in the absence of the latter, to an end 24a of the rotating screw. In particular, distance "1" existing between said gear pump 26 or the end 24a of the rotating screw 24, and the delivery opening 25, i.e. the length of duct 22c bounded by die 22b, is smaller than about 30 cm, preferably smaller than about 15 cm, so as to limit flowing of the blend on the duct 22c walls and thereby generation of dangerous local cross-linking of the blend. Preferably, also flange 22a and die 22b are thermoregulated, i.e. heated to a controlled temperature. Screw 24 and gear pump 26 too can be heated to a controlled temperature, by way of example included between about 40° C. and about 120° C.

Therefore the continuous elongated element 21 of raw elastomeric material having a substantially circular cross-section profile is delivered through the delivery opening 25. Alternatively, conformation of the delivery opening 25 and, consequently, of the cross-section profile of the continuous elongated element 21, can be of the ellipsoidal type. In both cases, the area of the cross section of the delivery opening 25 is preferably included between about 3.5 mm$^2$ and about 100 mm$^2$.

Said dimensional features allow the continuous elongated element 21 to be delivered according to a desired linear delivery speed "$V_1$", corresponding to a so-called "target value", of the volumetric flow rate, just as an indication included between about 1 cm$^3$/s and about 70 cm$^3$/s, without too many deformations being imposed to the mass of elastomeric material at the delivery opening 25. Thus the temperature of the elastomeric material at the delivery opening 25 can be advantageously maintained to relatively low values, just as an indication included between about 70° C. and about 110° C.

An application device 27 operating downstream of the feeding unit 20 carries out application of the continuous elongated element 21 coming from said feeding unit 20 onto the forming support 16 (FIG. 3).

During application, the forming support 16 supported in overhanging for example by one of said robotized arms 17, is driven in rotation at a peripheral speed "$V_3$" by suitable devices, and moved in front of the application device 27, for distributing the continuous elongated element 21 into coils disposed in approached and/or superposed relationship and wound around this forming support 16, so as to form a liner 5 for example, or any other component of elastomeric material of the tyre being processed.

The application device 27 comprises at least one application member 28 acting in thrust relationship towards the forming support 16, by effect of a pneumatic actuator 29 for example, for applying the continuous elongated element 21 onto the forming support 16.

As shown in the drawings, the application member 28 is a roller mounted, preferably idly, on a rocking arm 27a. The end of the rocking arm 27a opposite to the end carrying roller 28 is connected to the pneumatic actuator 29. A cylindrical side surface 28a of the idler roller 28 rests on and pushes against the continuous elongated element 21 applied to the forming support 16. Said cylindrical side surface 28a is preferably made of a silicone-based anti-sticking material.

Operatively disposed between the feeding unit 20 and the application device 27 is a conveyor 30 the function of which is to bring the continuous elongated element 21 coming out of the feeding unit 20 onto the forming support 16 and close to the application device 27. The application member 28 is preferably operatively supported with respect to conveyor 30.

Conveyor 30 has a moving surface 31 which carries out a continuous motion along a predetermined direction "X", at a linear advancing speed "$V_2$" and towards a proximal end 32 of the conveyor 30 adjacent to the forming support 16.

The continuous elongated element 21 is advanced on the moving surface 31 along the predetermined direction "X" and guided until the proximal end 32, at which the application device 27 is positioned.

In the preferred embodiment shown, conveyor 30 comprises a conveyor belt 33 wrapped on a proximal roller 34a, located at the proximal end 32 of conveyor 30, and on a distal roller 34b, located at the distal end 35 of conveyor 30 opposite to the proximal end 32 and adjacent to the delivery opening 25 of extruder 22. One or both rollers 34a, 34b are power driven.

The conveyor belt 33 can be for instance defined by a toothed belt passing over rollers 34a, 34b having a peripheral toothing. The conveyor belt 33, at least in the portion coming into contact with the continuous elongated element 21, is made of a preferably silicone-based anti-sticking material.

The conveyor belt 33 at the upper part thereof has a rectilinear going stretch 33a supporting the elongated element 21 and therefore defining the moving surface 31 which substantially lies in a single plane.

The conveyor belt 33 is such driven that it follows the continuous elongated element 21 moving away from extruder 22 until close to the application member 28.

Conveyor 30 and applicator roller 28 can have a size in width substantially as high as that of the continuous elongated element 21, so that they do not hinder movement of the forming support 16 by the robotized arm during laying of the continuous elongated element 21. In different embodiments, the width of the conveyor belt 33 can vary between about 0.8 and about 3 times the width of the continuous elongated element 21.

Conveyor 30 further comprises a presser device 36 mounted to the distal end 35 of conveyor 30. In the embodiment shown, the presser device 36 comprises a roller 37 which faces the moving surface 31 of conveyor 30 and has a cylindrical side surface 38 susceptible of engagement with the continuous elongated element 21. Roller 37 is freely rotatable around a rotation axis of its own substantially parallel to the rotation axes of the proximal 34a and distal 34b rollers of conveyor 30 and to that of roller 28 of the application device 27. The cylindrical side surface 38 of roller 37 too is preferably made of silicone-based anti-sticking material.

Roller 37 is pushed towards the moving surface 31 of conveyor 30 and pressed against the continuous elongated element 21 through a presser element 39, of the elastic type for example, such as a spring, or of a hydraulic or pneumatic type.

In the embodiment shown, roller 37 is positioned immediately downstream of extruder 22, so as to guide the continuous elongated element 21 on the conveyor belt 33 and keep the continuous elongated element 21 in contact with said conveyor belt 33.

In this manner, the continuous elongated element 21, at least in the region immediately downstream of the presser device 36, moves together with the moving surface 31 and at the same linear advancing speed "$V_2$" as the latter. The continuous elongated element 21 exiting extruder 22 is directly fed between roller 37 and the moving surface 31 without interposition of other devices adapted to modify the section of same, such as calenders, etc., for example. In fact, as shown in FIG. 3, in the region placed downstream of the delivery opening 25 and upstream of conveyor 30 no devices of the above mentioned type are present.

The forming device 19 further comprises an electronic control unit 40 operatively connected to extruder 22, the devices determining rotation of support 16 and conveyor 30. The control unit 40 is provided with sensors capable of detecting the operating parameters of the forming devices 19, among which linear delivery speed "$V_1$", linear advancing speed "$V_2$", and peripheral speed "$V_3$" and is able to modify one or more of these speeds before starting application and/or during an application cycle.

In use, the continuous elongated element 21 delivered from extruder 22 at the linear delivery speed "$V_1$" is directly routed between roller 37 of the presser device 36 and belt 33. Roller 37 presses against the continuous elongated element 21 that in turn presses against belt 33 and gives the continuous elongated element 21 the same linear advancing speed "$V_2$" as that of belt 33, which is different from the linear delivery speed "$V_1$". Preferably, the linear advancing speed "$V_2$" is included between about 0.75 times and about 0.995 times the linear delivery speed "$V_1$".

In different embodiments, the linear advancing speed "$V_2$" is included between about 1.005 times and about 1.5 times the linear delivery speed "$V_1$".

If the linear advancing speed "$V_2$" is higher than the linear delivery speed "$V_1$", the continuous elongated element 21 is axially drawn, close to roller 37. The ratio of the area of the cross-section of the continuous elongated element 21 downstream of roller 37 to the area of the cross-section of the continuous elongated element 21 upstream of roller 37 that is substantially coincident with that of the delivery opening 25, is preferably included between about 0.7 and about 0.99.

If the linear advancing speed "$V_2$" is lower than the linear delivery speed "$V_1$", the continuous elongated element 21 is axially compressed, close to roller 37. The ratio between the area of the cross-section of the continuous elongated element 21 downstream of roller 37 and the area of the cross-section of the continuous elongated element 21 upstream of roller 37 that is substantially coincident with that of the delivery opening 25, is preferably included between about 1.01 and about 1.3.

Once the continuous elongated element 21 has reached the proximal end 32, it leaves conveyor 30 and is applied to the forming support 16 passing between the support 16 itself and the application member 28.

The application member 28 presses against the continuous elongated element 21 that in turn presses against the forming support 16 and gives the continuous elongated element 21 the peripheral speed "$V_3$" of the forming support 16 which is higher than the linear delivery speed "$V_1$".

Preferably, the peripheral speed "$V_3$" is included between about 1.2 times and about 7 times the linear delivery speed "$V_1$", more preferably is included between about 1.3 times and about 1.6 times the linear delivery speed "$V_1$.".

Preferably, in addition, the peripheral speed "$V_3$" is higher than the linear advancing speed "$V_2$" and the continuous elongated element 21 is therefore preferably drawn in the length included between the presser device 36 and the application member 27.

In these embodiments, the continuous elongated element 21 through the two quick speed changes is in any case axially drawn as compared with when it exits the extruder 22.

The ratio between the area of the cross-section of the continuous elongated element 21 once laid on the forming support 16 and the area of the cross-section of the continuous elongated element 21 coming out of extruder 22, which is substantially coincident with that of the delivery opening 25, is preferably higher than or as high as about 0.3 and lower than 1. Since the first quick speed change can involve drawing or compression, axial drawing can take place both at the presser device 36 and at the application member 28 or fully at the application member 28.

Alternatively, in different embodiments the peripheral speed "$V_3$" can be lower than the linear delivery speed "$V_1$", so as to compress the continuous elongated element 21. This solution is adopted with particular elastomeric materials or geometry of a tyre component such as to require winding of coils with a continuous elongated element 21 having greater section than the section of the delivery opening 25.

In these cases too it is possible to have said speed reduction with consequent compression and increase in the section area in two distinct steps even if "$V_2$" is lower than "$V_1$", or it is possible to have a step of speed reduction and consequent compression preceded by a step of speed increase and consequent drawing (or stretching), when "$V_2$" is higher than "$V_1$".

Preferably, in the last-mentioned embodiments, the peripheral speed "$V_3$" is included between about 0.5 times and about 0.95 times the linear delivery speed "$V_1$". More preferably, the peripheral speed "$V_3$" is included between about 0.65 times and about 0.85 times the linear delivery speed "$V_1$".

The ratio between the area of the cross-section of the continuous elongated element 21 once laid on the forming support 16 and the area of the cross-section of the continuous elongated element 21 coming out of extruder 22, that is substantially coincident with that of the delivery opening 25, is preferably smaller than or as high as about 1.5 and greater than 1.

The ratio between the linear advancing speed "$V_2$" and the linear delivery speed "$V_1$" and the ratio between the peripheral speed "$V_3$" and the linear delivery speed "$V_1$" can be inputted before starting laying and maintained constant during application or varied, even in a manner independent of each other, during the application itself, to change the features of the continuous elongated element 21, based on the laying regions on the forming support 16. This form of laying is particularly advantageous above all if said forming support 16 is of toroidal conformation due to the particular geometry of the components to be built when building takes place on an already "shaped" profile.

At the end of application, the continuous elongated element 21 is cut at a region included between extruder 22 and conveyor 30, preferably this region being close to the delivery opening 25, and the length of continuous elongated element 21 disposed downstream of the cutting point is fully applied to the forming support 16.

The invention claimed is:

1. A process for building a tyre comprising forming components of elastomeric material on a forming support, wherein at least one of said components of elastomeric material is made by:
   producing a continuous elongated element of elastomeric material through an extruder, said element having a linear delivery speed on coming out of said extruder;
   feeding the continuous elongated element from the extruder directly between a moving surface of a conveyor belt and a presser device within a conveyor, without interposition of other devices upstream of the conveyor adapted to receive the continuous elongated element, wherein the conveyor belt is wrapped on a distal roller located at a distal end of the conveyor adjacent the extruder thereby eliminating calendaring;
   pressing said continuous elongated element on the moving surface through said presser device to give a linear advancing speed to the continuous elongated element;
   advancing said continuous elongated element of elastomeric material on the moving surface along a predetermined direction and at said linear advancing speed different from said linear delivery speed until said material reaches a proximal end of said conveyor; and
   applying the continuous elongated element having a desired cross-section into coils wound up on the forming support, to form said at least one component of elastomeric material of the tyre;
   said forming support rotating relative to the proximal end of the conveyor at a peripheral speed,
   wherein the peripheral speed is different from the linear delivery speed, so as to deform the continuous elongated element,
   wherein a ratio between the peripheral speed and linear delivery speed and the ratio between the linear advancing speed and linear delivery speed are varied during applying said continuous elongated element by modifying during an application cycle the linear advancing speed and subsequently modifying the peripheral speed thereby creating two distinct steps to obtain the desired cross-section without calendaring; and
   wherein, at the end of each application, the continuous elongated element is only cut at a cutting point between the extruder and the conveyor.

2. The process as claimed in claim 1, wherein the peripheral speed is higher than the linear delivery speed, so as to draw the continuous elongated element.

3. The process as claimed in claim 1, wherein the peripheral speed is greater than or equal to about 1.2 times the linear delivery speed.

4. The process as claimed in claim 1, wherein the peripheral speed is greater than or equal to about 1.3 times the linear delivery speed.

5. The process as claimed in claim 1, wherein the peripheral speed is less than or equal to about 1.6 times the linear delivery speed.

6. The process as claimed in claim 1, wherein the peripheral speed is less than or equal to about 7 times the linear delivery speed.

7. The process as claimed in claim 1, wherein the peripheral speed is lower than the linear delivery speed, so as to compress the continuous elongated element.

8. The process as claimed in claim 7, wherein the peripheral speed is between about 0.5 times and about 0.95 times the linear delivery speed.

9. The process as claimed in claim 7, wherein the peripheral speed is between about 0.65 times and about 0.85 times the linear delivery speed.

10. The process as claimed in claim 1, wherein the linear advancing speed is higher than the linear delivery speed.

11. The process as claimed in claim 1, wherein the linear advancing speed is less than or equal to about 1.5 times the linear delivery speed.

12. The process as claimed in claim 1, wherein the linear advancing speed is greater than or equal to about 1.005 times the linear delivery speed.

13. The process as claimed in claim 1, wherein the linear advancing speed is lower than the linear delivery speed.

14. The process as claimed in claim 1, wherein the linear advancing speed is greater than or equal to about 0.75 times the linear delivery speed.

15. The process as claimed in claim 1, wherein the linear advancing speed is less than or equal to about 0.995 times the linear delivery speed.

16. The process as claimed in claim 1, wherein said forming support is a toroidal support.

\* \* \* \* \*